US011772989B2

(12) United States Patent
Cochrane et al.

(10) Patent No.: US 11,772,989 B2
(45) Date of Patent: Oct. 3, 2023

(54) DEVICE FOR TREATING ROOF RUNOFF (71) Applicant: UNIVERSITY OF CANTERBURY, Christchurch (NZ)

(72) Inventors: Tom Cochrane, Christchurch (NZ); Frances Charters, Christchurch (NZ); Aisling O'Sullivan, Christchurch (NZ)

(73) Assignee: UNIVERSITY OF CANTERBURY, Christchurch (NZ)

( * ) Notice: Subject to any disclaimer, the term of this patent is extended or adjusted under 35 U.S.C. 154(b) by 16 days.

(21) Appl. No.: 17/040,283

(22) PCT Filed: Mar. 22, 2019

(86) PCT No.: PCT/NZ2019/050029
§ 371 (c)(1),
(2) Date: Sep. 22, 2020

(87) PCT Pub. No.: WO2019/182460
PCT Pub. Date: Sep. 26, 2019

(65) Prior Publication Data
US 2021/0024377 A1 Jan. 28, 2021

(30) Foreign Application Priority Data
Mar. 23, 2018 (NZ) ........................ 740976

(51) Int. Cl.
*C02F 1/28* (2023.01)
*B01J 20/04* (2006.01)
(Continued)

(52) U.S. Cl.
CPC ............. *C02F 1/281* (2013.01); *B01J 20/043* (2013.01); *B01J 20/28004* (2013.01);
(Continued)

(58) Field of Classification Search
None
See application file for complete search history.

(56) References Cited

U.S. PATENT DOCUMENTS 3,890,225 A * 6/1975 Kajiyama ................. C04B 7/00
                                                    210/688
6,248,233 B1 * 6/2001 Priggemeyer ............ E03B 3/02
                                                    210/170.03
(Continued)

FOREIGN PATENT DOCUMENTS

AU 2009201113 A1 10/2009
JP 11131537 5/1999
(Continued)

OTHER PUBLICATIONS

Mason, et al., Behavior of Heavy Metals, Nutrients, and Major Components during Roof Runoff Infiltration, Environ. Sci. Technol., 1999,33, 1588-1597 (Year: 1999).*
(Continued)

*Primary Examiner* — Chester T Barry
(74) *Attorney, Agent, or Firm* — Sughrue Mion, PLLC (57) ABSTRACT

A device for treating roof runoff has a first tube adapted to be axially aligned with, and in fluid communication with, an outlet of a downpipe. The first tube contains a crushed calcium carbonate media. The device has a second tube in fluid communication with the first tube. The first tube and second tube are arranged such that when a flow of roof runoff from the downpipe is at or below a predetermined flow rate, the flow of roof runoff is directed into the first tube to be treated by the crushed calcium carbonate media contained therein, and when the flow of roof runoff is above the predetermined flow rate, excess flow is diverted into the second tube.

34 Claims, 5 Drawing Sheets

(51) Int. Cl.
    *B01J 20/28*     (2006.01)
    *C01F 11/18*     (2006.01)
    *C02F 1/00*     (2023.01)
    *C02F 1/66*     (2023.01)
    *E04D 13/08*     (2006.01)
    *C02F 101/20*     (2006.01)
    *C02F 103/00*     (2006.01)

(52) U.S. Cl.
    CPC ......... *B01J 20/28016* (2013.01); *C01F 11/18* (2013.01); *C02F 1/001* (2013.01); *C02F 1/66* (2013.01); *E04D 13/08* (2013.01); *C01P 2004/60* (2013.01); *C02F 2101/20* (2013.01); *C02F 2103/001* (2013.01); *E04D 2013/082* (2013.01); *E04D 2013/086* (2013.01)

(56) References Cited

U.S. PATENT DOCUMENTS

| | | | |
|---|---|---|---|
| 6,264,841 B1* | 7/2001 | Tudor | B01J 20/043 |
| | | | 210/688 |
| 9,631,368 B1* | 4/2017 | Heo | E04D 13/004 |
| 2004/0031753 A1 | 2/2004 | Herman et al. | |
| 2008/0260920 A1* | 10/2008 | Roth | A23B 4/16 |
| | | | 426/326 |
| 2009/0101555 A1* | 4/2009 | Scarpine | C02F 1/004 |
| | | | 210/170.03 |
| 2012/0145640 A1 | 6/2012 | Davis et al. | |
| 2014/0183111 A1 | 7/2014 | Johnson et al. | |
| 2017/0232141 A1* | 8/2017 | Surti | A61L 26/0061 |
| | | | 602/61 |
| 2020/0223716 A1* | 7/2020 | Chang | B01D 24/02 |

FOREIGN PATENT DOCUMENTS

| | | |
|---|---|---|
| JP | 2009121198 | 6/2009 |
| JP | 4728439 B1 | 7/2011 |

OTHER PUBLICATIONS

Paula M. Deano et al., The effect of decaying leaves on the pH and buffer capacity of waters, Journal of Environmental Science and Health. Part A: Environmental Science and Engineering, vol. 20, 1985—Issue 8 (Abstract only) (Year: 1985).*
Written Opinion for PCT/NZ2019/050029, dated Jun. 7, 2019.
International Search Report for PCT/NZ2019/050029, dated Jun. 7, 2019.
Communication, dated Nov. 10, 2021, issued by the European Patent Office in counterpart Application No. EP 19 77 2396.8.
Communication, dated Nov. 30, 2021, issued by the European Patent Office in counterpart Application No. EP 19 77 2396.8.

* cited by examiner

DEVICE FOR TREATING ROOF RUNOFF

CROSS REFERENCE TO RELATED APPLICATIONS

This application is a National Stage of International Application No. PCT/NZ2019/050029, filed Mar. 22, 2019, claiming priority based on New Zealand Patent Application No. 740976, filed Mar. 23, 2018.

This invention relates to a device for treating roof runoff.

BACKGROUND

Stormwater is generated when rainfall runs over impermeable surfaces such as roofs, roads and carparks. It contains particulate (sediment-adsorbed) pollutants that have fallen onto these surfaces (e.g. sediment, copper and zinc from vehicles) and also dissolves the surface material itself. Many roof surfaces, particularly in commercial and industrial areas, but also many old and new residential zones, are metallic (including zinc-based galvanised roofs and copper roofs). Due to air quality and natural acidity of rainfall, these roofs leach heavy metals such as zinc and copper via rainfall-runoff, which is typically captured by the roof's gutter and downpipe system and then conveyed via a stormwater network to be discharged typically untreated into a local waterway. The metals in roof runoff are predominantly in dissolved forms, voluminous, and are highly eco-toxic to the receiving aquatic environment.

Dissolved metals are difficult to treat because the treatment involves chemical or absorption processes instead of just filtration. Removing the dissolved metals as close to source as possible is considered good practice in stormwater management. It prevents the dissolved metal-laden roof water from mixing with other road and hardstand runoff and creating a greater volume of runoff that still requires treatment for dissolved metals to prevent environmental degradation. At source treatment may also reduce the footprint of a downstream treatment system because of lower volumes requiring treatment.

Current stormwater treatment devices require relatively long retention times in sizeable tanks and costly chemicals to remove the dissolved heavy metals. For these reasons, they are rarely implemented. There is a need for a treatment device that is cost-effective, space-efficient, and provides treatment at the source of roof runoff.

It is an object of at least preferred embodiments of the present invention to provide a device for treating roof runoff by removing dissolved metals (such as zinc and copper), and/or to at least provide the public with a useful alternative.

SUMMARY OF THE INVENTION

In accordance with a first aspect of the invention, there is provided a device for treating roof runoff, the device comprising:

a first tube adapted to be axially aligned with, and in fluid communication with, an outlet of a downpipe, the first tube containing a crushed calcium carbonate media;

a second tube in fluid communication with the first tube;

the first tube and second tube being arranged such that when a flow of roof runoff from the downpipe is at or below a predetermined flow rate, the flow of roof runoff is directed into the first tube to be treated by the crushed calcium carbonate media contained therein, and when the flow of roof runoff is above the predetermined flow rate, excess flow is diverted into the second tube.

In one embodiment, the device is adapted to be fitted to an existing downpipe.

In one embodiment, the first tube is adapted to receive a downpipe.

In one embodiment, the calcium carbonate media comprises a marine organism shell, limestone, snail shell, eggshell, dead coral, or a mixture thereof.

In one embodiment, the marine organism shell is mussel shell.

In one embodiment, the crushed calcium carbonate media is crushed to an average particle size of up to about 10 mm.

In one embodiment, the crushed calcium carbonate media is crushed to an average particle size of from about 1 mm to about 3 mm.

In one embodiment, the crushed calcium carbonate media is crushed to an average particle size of from about 1.18 mm to about 2.36 mm.

In one embodiment, the first tube is positioned inside the second tube.

In one embodiment, the device decreases the concentration of dissolved heavy metals in the roof runoff.

In one embodiment, the device decreases the concentration of dissolved zinc and copper in the roof runoff.

In one embodiment, the device decreases the concentration of dissolved zinc in the roof runoff by greater than about 80%, preferably greater than about 90%, even more preferably greater than about 95%.

In one embodiment, the device decreases the concentration of dissolved copper in the roof runoff by greater than about 80%, preferably greater than about 90%, even more preferably greater than about 95%.

In one embodiment, the device decreases the concentration of dissolved zinc and copper in the roof runoff by greater than about 80%, preferably greater than about 90%, even more preferably greater than about 95%.

In one embodiment, the device comprises at least one foreign body trap.

In one embodiment, the crushed calcium carbonate media has a minimum saturated hydraulic conductivity of about 0.15 m/min.

In one embodiment, the crushed calcium carbonate media has a saturated hydraulic conductivity of about 0.15 m/min to about 0.56 m/min.

In one embodiment, the first tube comprises a pH adjustment media.

In one embodiment, the pH adjustment media comprises organic matter.

In one embodiment, the pH adjustment media comprises coffee grounds, compost, gravel, humus, peat moss, pine needles, or a mixture thereof.

In one embodiment, the pH adjustment media is downstream of the calcium carbonate media.

In one embodiment, the first tube is at least about 0.5 m long.

In one embodiment, the first tube is from about 0.5 m to about 1.5 m long, preferably about 1 m.

In one embodiment, the first tube is removable and preferably replaceable.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth. As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF A PREFERRED EMBODIMENT

1. Device for Treating Roof Runoff

Figure 1:
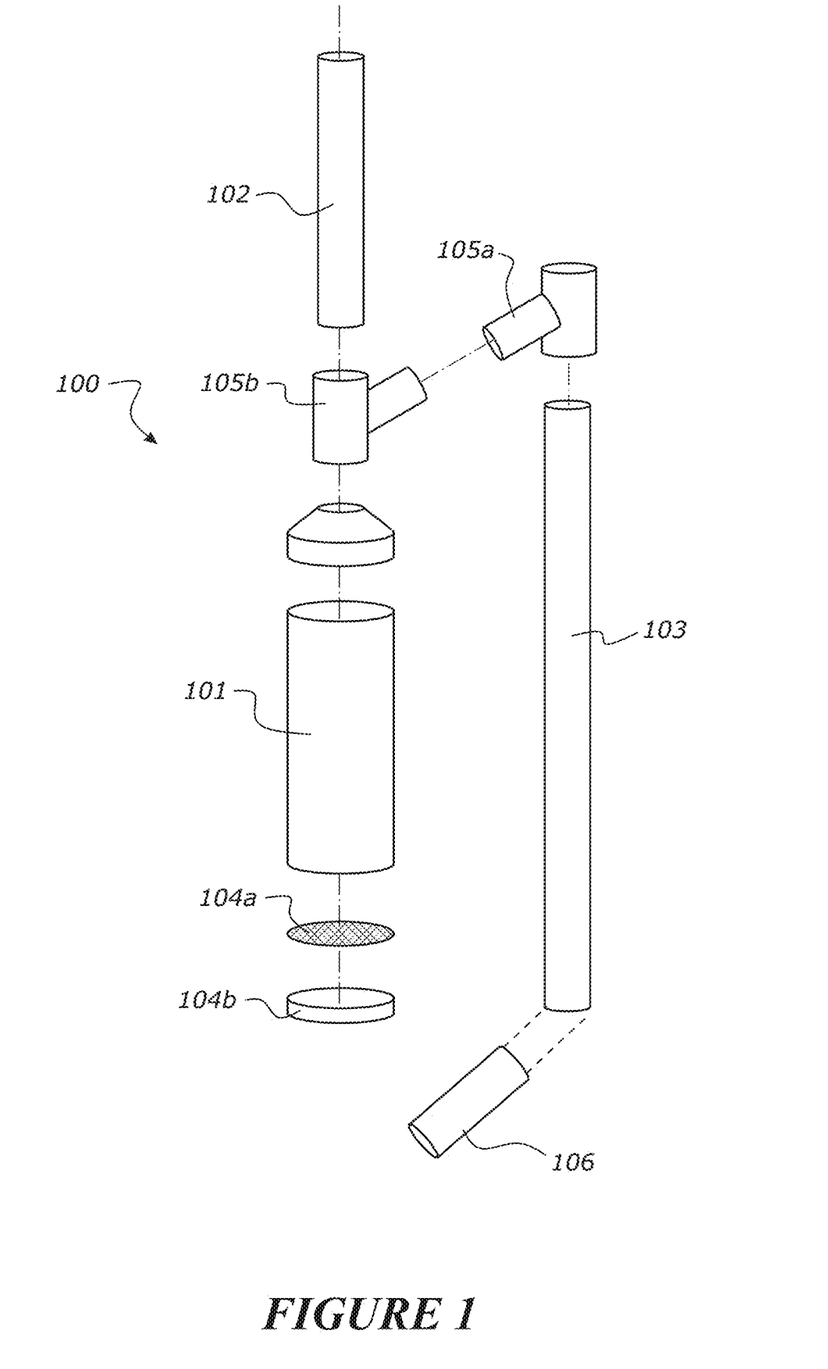
FIG. 1 shows an exploded view of a first embodiment of the device.

With reference to FIG. 1, a first preferred embodiment of the device for treating roof runoff will now be described. The first embodiment device is indicated generally with reference number 100.

The device 100 is configured for use within a roof's gutter and downpipe system that collects runoff from a roof that is then conveyed via a stormwater network to be discharged untreated into a local waterway. In particular, the device 100 is installed in a downpipe. The device 100 can be installed as part of the original downpipe, or may be retrofitted. The device 100 is installed above ground. In some situations, only a single device 100 is installed, or retrofitted, to a downpipe. In other situations, there may be two or more devices 100 installed, or retrofitted, to a downpipe. If there are two or more devices, they will be installed in parallel. For example, the guttering system may include a flow splitter that splits the flow into two streams, one stream being fed into a first downpipe and the other stream being fed into a second downpipe. Another mechanism to split the flow would be to use a conduit having an arrangement similar to the bypass port and tube shown and described in relation to FIG. 5. Such an arrangement is useful where the amount of flow of water from a roof is relatively high.

The device 100 has a first tube 101 adapted to be substantially axially aligned with an outlet of a downpipe 102.

The device 100 has a second tube 103 in fluid communication with the first tube 101. The first tube 101 and the second tube 103 are arranged such that when a flow of roof runoff from the downpipe 102 is at or below a predetermined flow rate, the flow of roof runoff is directed into the first tube 101 to be treated by the crushed calcium carbonate media (not visible) contained therein. All of the flow is advantageously directed into the first tube 101. When the flow of roof runoff is above the predetermined flow rate, excess flow is diverted into the second tube 103—the by-pass channel. The excess flow rejoins the main flow by travelling through tube 106.

The first tube 101 contains a crushed calcium carbonate media to treat the roof runoff, which is described in more detail below. The media is supported by a grate or grill 104a that is supported by a collar 104b. At the outlet of the device, the treated roof runoff flows in to a stormwater downpipe. This is typically the continuation of the downpipe since the embodiment sits within the downpipe. The treated roof run off may then flow into a sump that is in fluid communication with the stormwater downpipe. Roof runoff flows through the device 100 without requiring external force, such as a pump. The flow occurs solely due to the influence of gravity.

The second tube 103 is in fluid communication with the first tube 101 via a third tube 105a. The third tube 105a extends laterally and upwardly from the first tube 101. In the embodiment shown, the third tube is formed by two components. One component is a tube that is connected inline with the first tube, and the other component is a tube that is connected inline with the second tube. Each component has a short tube extending at an angle, and those tubes join together to form the third tube 105a. In this embodiment, excess water will flow through the third tube 105 in to the second tube 103 to be diverted to the stormwater network.

In periods of heavy rain, or other excess flow of roof runoff, water will be unable to flow solely through the first tube 101. Excess roof runoff may build in the first tube 101 and be able to flow through the second tube 103, which acts as a bypass mechanism.

The first tube 101 can include any hollow elongated shape, such as a cylinder, a rectangular tube, a square tube, a triangular tube, a pentagonal tube, a hexagonal tube, or any other shape capable of conveying roof runoff. The second tube 103 may also include any hollow elongated shape, such as a cylinder, a rectangular tube, a square tube, a triangular tube, a pentagonal tube, a hexagonal tube, or any other shape capable of conveying roof runoff. A cylindrical tube is preferred because it is less likely to clog.

In some embodiments, the first tube 101 may be at least 0.5 m long. For example, the first tube may be at least 0.6 m, 0.7 m, 0.8 m, 0.9 m, or 1.0 m long. In some embodiments, the first tube 101 is from about 0.5 m to about 1.5 m long. In a preferred embodiment, the first tube 101 is about 1.0 m long.

In some embodiments, the second tube 103 may be at least 0.5 m long. For example, the second tube 103 may be at least 0.6 m, 0.7 m, 0.8 m, 0.9 m, or 1.0 m long. In some embodiments, the second tube 103 is from about 0.5 m to about 1.5 m long.

Figure 3:
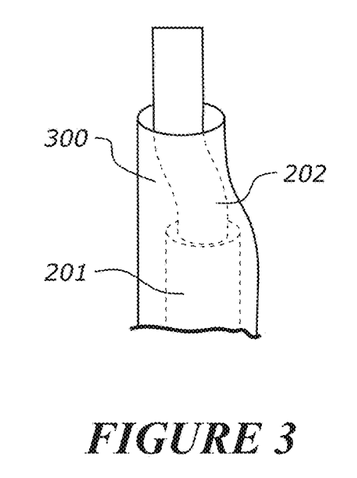
FIG. 3 is a partial perspective view of a circular downpipe fitting with the device.

In some embodiments, the lower end of the downpipe 102 may fit within the first tube 101. Therefore, the first tube 101 may have a shape and dimensions to allow the lower end of the downpipe 102 to fit within the first tube 101. In embodiments where the downpipe and the first tube are cylindrical, the diameter of the first tube may be greater than the diameter of the downpipe (FIG. 3). For example, the diameter of the downpipe may be 80 cm, and the diameter of the first tube may be 100 mm; or the diameter of the downpipe may be 100 cm, and the diameter of the first tube may be 120 mm. In embodiments where the downpipe is rectangular, the first tube may have a diameter wide enough to fit the width of the downpipe (FIG. 4).

Figure 2:
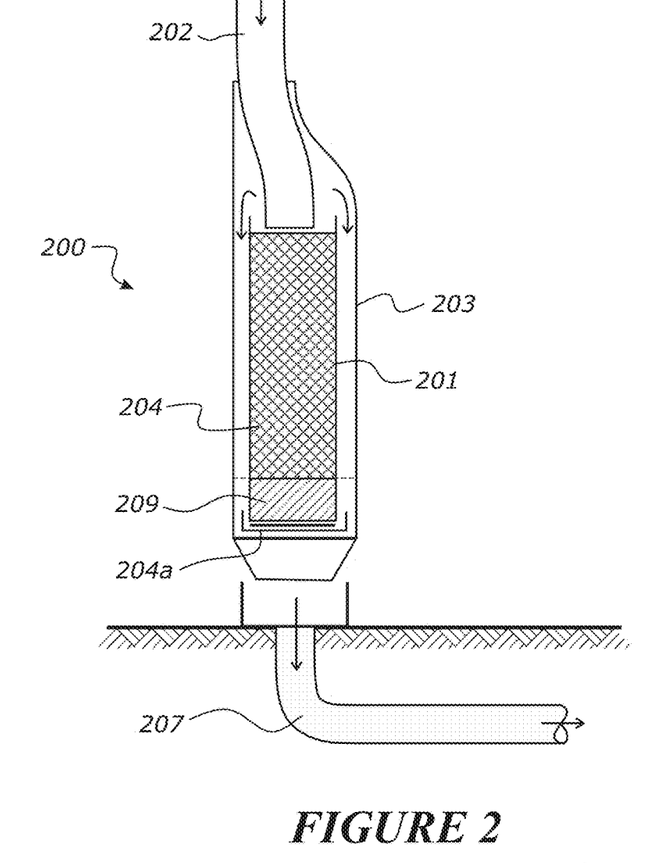
FIG. 2 shows a cross-sectional view of a second embodiment of the device.
Figure 4:
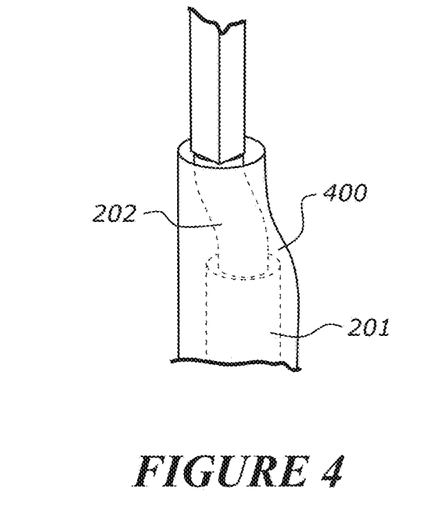
FIG. 4 is a partial perspective view of a rectangular downpipe fitting with the device.

With reference to FIGS. 2 to 4, the second embodiment device will now be described. The second embodiment device is indicated generally with reference number 200. The second embodiment device 200 is similar to the first embodiment device 100, except as described below. The structure and functions of the features of the second embodiment device are the same as the first embodiment device, unless described below. Similar reference numbers are used for similar features with the addition of 100.

With reference to the second embodiment device 200 shown in FIG. 2, the first tube 201 is an inner tube and the second tube 203 is an outer tube. The inner tube 201 is positioned wholly within the outer tube 203, as shown in FIG. 2. The outer tube 203 may be at least as long as the inner tube.

The first tube 201 is in fluid communication with the second tube 203 because of the free space at the top of the first tube 201 that allows excess roof runoff to flow through the annular passage provided between the first tube 201 and the second tube 203.

In the second embodiment, the outer tube 203 may have dimensions to allow the inner tube 201 to wholly fit within the outer tube 203, and allow flow of excess roof runoff in the outer tube 203. For example, the inner tube 201 may be a cylindrical tube with a diameter of 100 mm and the outer tube may be a cylinder with a diameter of 120 mm.

In some embodiments, the device 200 may comprise an adaptor 300/400 to facilitate the downpipe 202 to fit within the first tube 201, as shown in FIGS. 3 and 4. An adaptor may have a circular top end profile to fit on a circular downpipe (FIG. 3), or a rectangular top end profile to fit on a rectangular downpipe (FIG. 4). The bottom end of the adaptor 300/400 may have dimensions to allow it to fit within the first tube, to direct flow of water in to the first tube.

In some embodiments, the lower end of the first tube 201 or the second tube 203 may be adapted to fit to a stormwater pipe or a stormwater sump. In some embodiments, the dimensions of the lower end of the first tube 201 or second tube 203 may allow the lower end of the first tube 201 or second tube 203 to fit within the stormwater pipe or stormwater sump. As with the top of the first tube 201, an adaptor may be used to facilitate the lower end of the first or second tube to fit within the stormwater pipe or stormwater sump.

In some embodiments, the device is adapted to be fit to a plastic downpipe, for example a polyvinyl chloride (PVC) or acrylic downpipe, or a metal downpipe, for example a cast iron downpipe, a copper downpipe, a stainless steel downpipe, or an aluminium downpipe. In preferred embodiments the device is adapted to be fit to a plastic downpipe.

Any combination of shapes and sizes of first tubes, second tubes, downpipes, and adaptors that provide dimensions to allow fitting and flow of water are envisioned.

Figure 5:
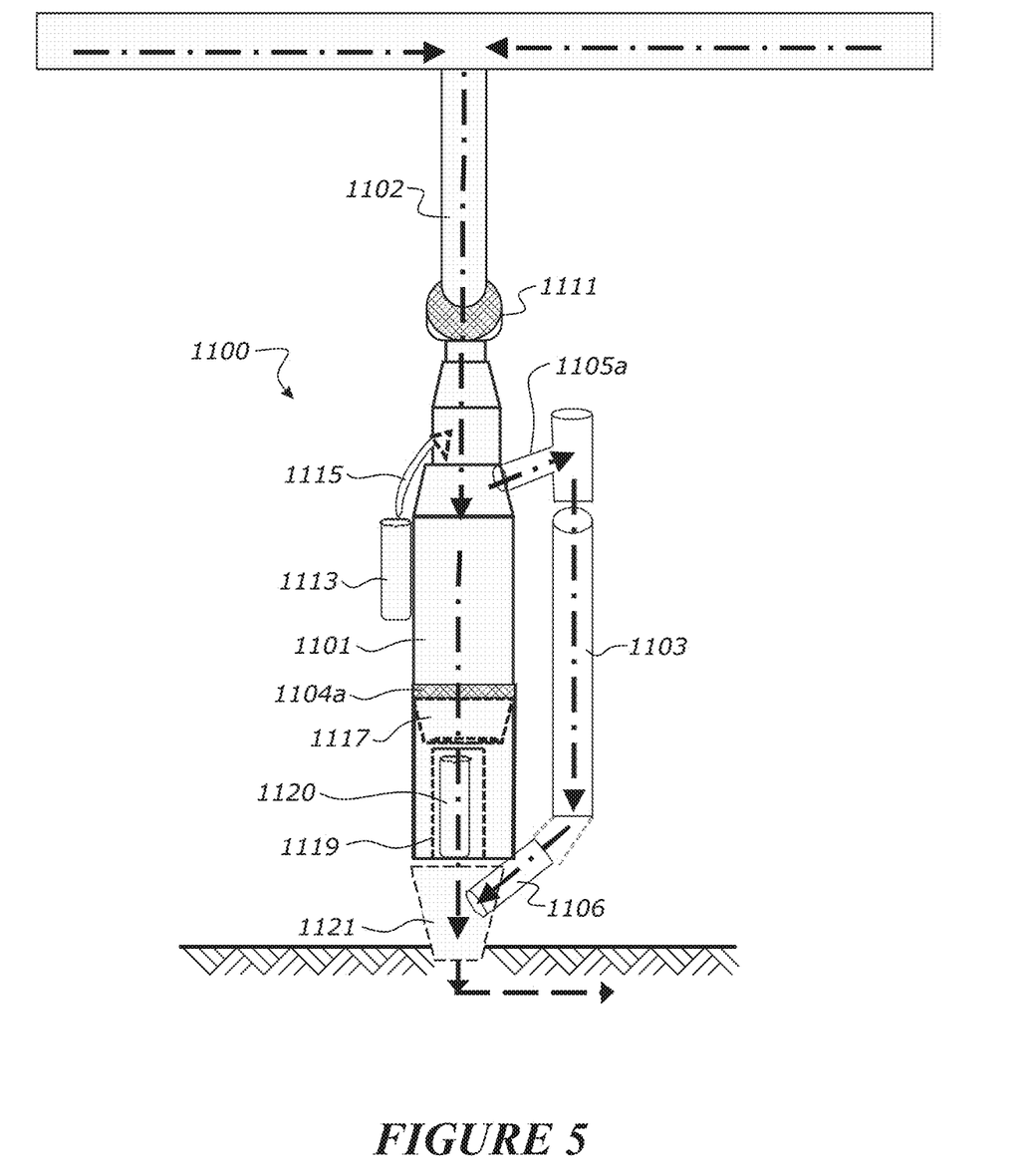
FIG. 5 shows a schematic view of a third embodiment of the device.
Figure 6:
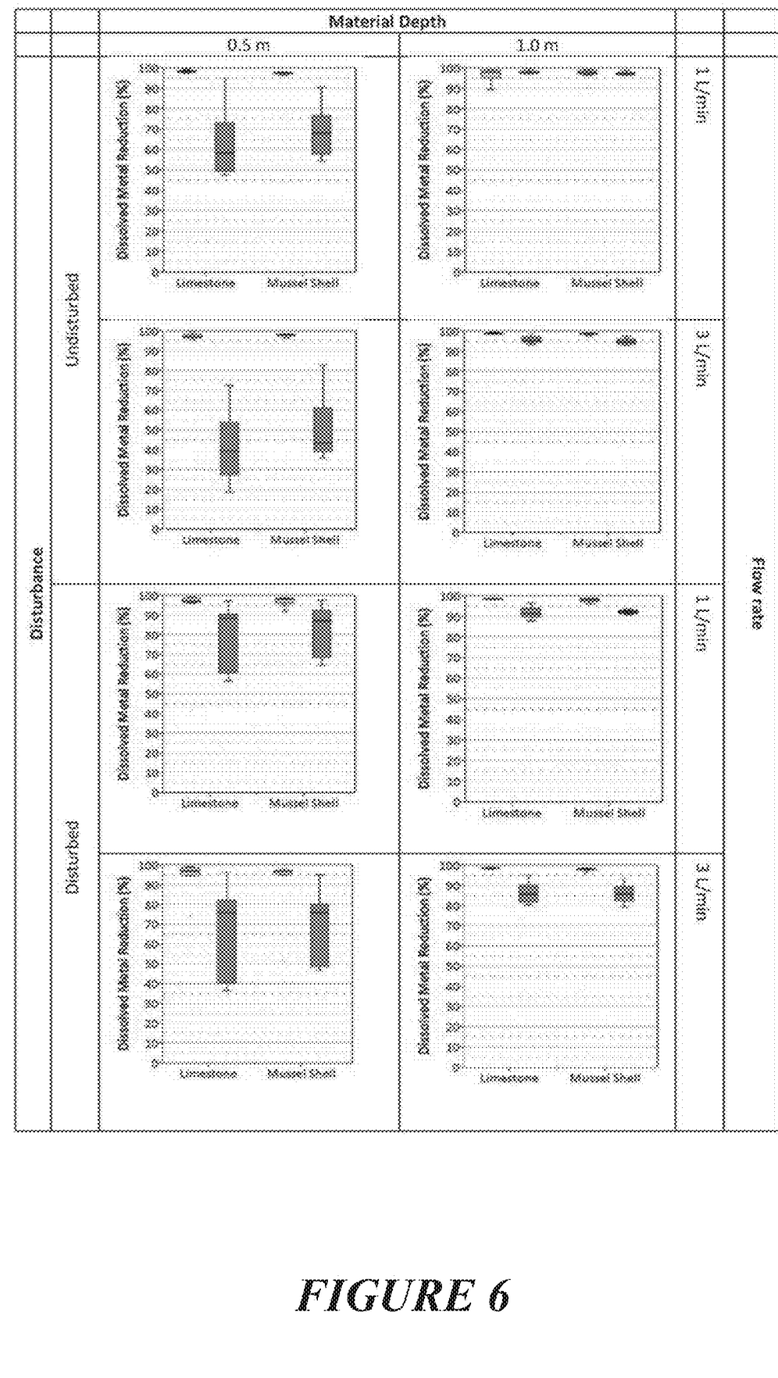
FIG. 6 shows a comparison of the percentage reduction in dissolved Zn and Cu in roof-runoff treated by limestone and mussel shells at two material depths (0.5 m and 1 m), flow rates (1 L/min and 3 L/min) and when materials were undisturbed and disturbed.

In some embodiments, the device comprises at least one foreign body trap. The foreign body trap or traps may be positioned upstream or downstream of the treatment media 204, or multiple foreign body traps may be both upstream and downstream of the treatment media. The foreign body trap may be a mesh or grate. The mesh or grate is advantageously formed from a non-metallic benign materials (such as PVC plastic, geotextile, or acrylic). The mesh or grate may be formed from a metallic material. However, if a metallic material is used, it will preferably not contain zinc or copper in case those metals leach into the runoff. A suitable foreign body trap is shown in FIG. 5 (discussed in more detail below) and labelled 1111.

The device 200 may be installed in a new downpipe or retrofit to an existing downpipe. To fit to an existing downpipe, the downpipe 202 may be cut at appropriate points relative to the length of the device and any associated adaptors, if used. The device may be attached to the downpipe by using a suitable adhesive such as PVC pipe cement, room-temperature-vulcanizing silicon, glue, and also clamped. Typically, the clamps are placed around the outer circumference of the device. Parts of the device may be removable and replaceable. In this situation, PVC pipe cement is a preferred adhesive.

Figure 7:
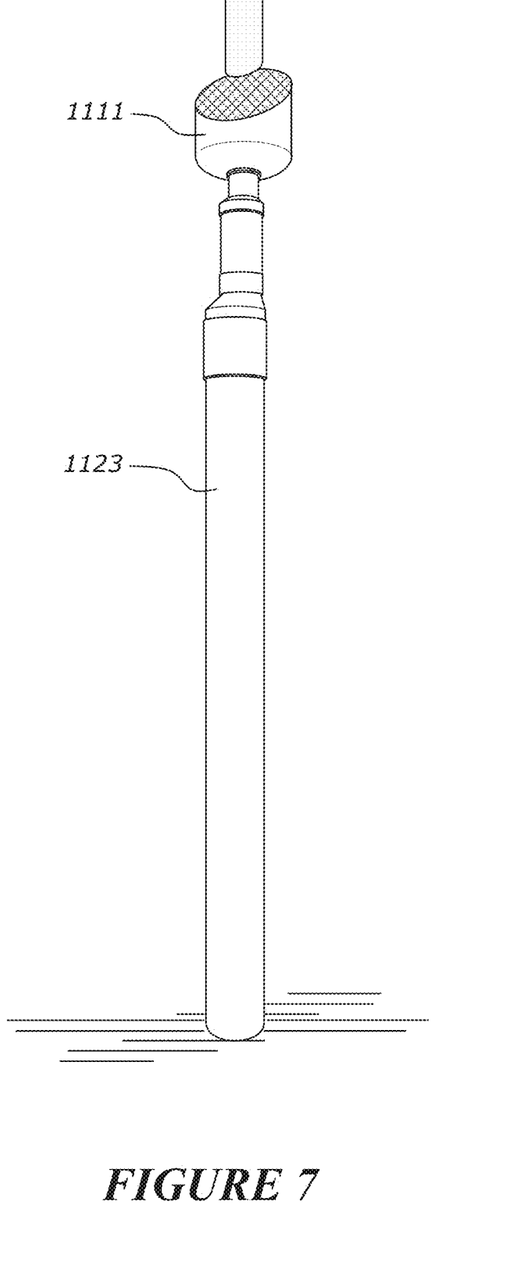
FIG. 7 shows a perspective view of the device having a supporting base.
Figure 8:
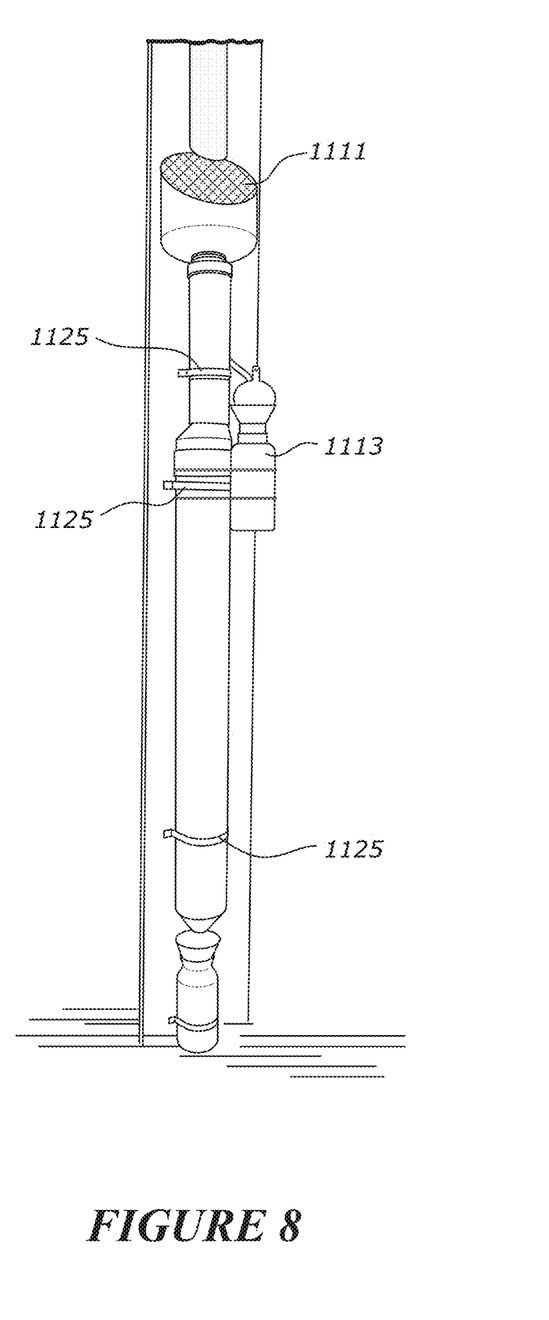
FIG. 8 shows a perspective view of the embodiment of FIG. 5.

The device may be installed by mounting to a wall by a bracket such as a stand-off bracket or a flush bracket, such as the brackets 1125 shown in FIG. 8. In some embodiments, the device may be supported by the ground or other component, such as the base 1123 shown in FIG. 7. In some embodiments, the device may be suspended from part of the building.

In some embodiments the first tube 201 is replaceable. The device 200 may be removed from its attachment to the downpipe 202, the first tube 201 removed, and replaced with a new first tube (cartridge). The replacement first tube 201 may comprise fresh treatment media 204, pH adjustment media 209, and foreign body traps, where applicable.

In some embodiments, the treatment media 204 and/or pH adjustment media 209 may be removable from the first tube 101/201, and can be replaced with fresh media.

The device 100/200 is adapted to be installed in-line with a downpipe 102/202. Once installed the device 100/200 will have a similar, or slightly larger, diameter compared to a conventional downpipe.

The device 100/200 does not substantially increase the footprint of the downpipe system of an existing downpipe system.

Treatment Media

The device comprises a crushed calcium carbonate media 204, or treatment media, positioned within the first tube 101/201.

The treatment media 204 may be a marine organism shell, limestone, snail shell, eggshell, dead coral, or a mixture thereof. In some embodiments, the marine organism shell may be mussel shell. In some embodiments the treatment media 204 may be crushed to an average particle size of up to about 10 mm. For example, the treatment media 204 may be crushed to a particle size of up to about 9 mm, or about 8 mm, or about 7 mm, or about 6 mm, or about 5 mm, or about 4 mm, or about 3 mm. In some embodiments, the treatment media 204 may be crushed to an average particle size of from about 0.5 mm to about 10 mm, or any range within, for example from about 1 mm to about 10 mm, or from about 1 mm to about 8 mm, or from about 1 mm to about 6 mm, or from about 1 mm to about 3 mm. In some embodiment, the treatment media 204 may be is crushed to an average particle size of about 1.18 mm to about 2.36 mm.

Mussel shells are an effective choice for treatment media 204 as they are a waste product in good supply, and are lightweight with a higher surface area to volume ratio that enhances treatment efficiency.

The device decreases the concentration of dissolved heavy metals in the roof runoff. Heavy metals are metals of relatively high density, including, but not limited to, zinc, copper, tin, silver, gold, platinum, magnesium, aluminium, titanium, chromium, arsenic, cadmium, mercury, or lead. In some embodiments, the device decreases the concentration of dissolved zinc and/or copper in the roof runoff. In some embodiments, the device decreases the concentration of dissolved zinc and/or copper in the roof runoff by greater than about 80%, for example, greater than about 85%, greater than about 90%, greater than about 95%, or greater than about 98%.

The dissolved metals may be in ionic form. The concentration of dissolved metals in the roof runoff is reduced by adsorption, absorption, precipitation, and/or reaction of the dissolved metals with the crushed calcium carbonate media 204. Calcium carbonate media 204 derived from animal shells may comprise residual meat comprising chitin, protein, phosphate and lipid, and algae or biofilms. Biofilms may grow on the calcium carbonate media 204 over time, which will likely enhance treatment. Residual meat, algae, or biofilms may facilitate absorption of dissolved heavy metals. The alkalinity of the calcium carbonate media 204 may facilitate a pH increase to effect metal removal by precipitation, adsorption, or other methods. Mussel shells are an effective choice for treatment media as they have a higher surface area to volume compared with other media because of the unique surfaces of the inner shells (that is, a higher roughness). The surface area to volume is also increased because the mussel shells are crushed.

The crushed calcium carbonate media 204 will result in higher surface area available for accelerated/enhanced interaction of the dissolved heavy metals with the calcium carbonate media 204. The crushed treatment media 204 may be crushed to a size to provide adequate flow of roof runoff through the device. The particle size affects the adsorption capacity of the media 204 and the hydraulic retention time. The flow may be fast enough that the device does not overflow in to the bypass (second tube) easily, but slow enough that the treatment can occur as the roof runoff flows through the treatment media 204.

The crushed treatment media 204 particle size is chosen to ensure a suitable saturated hydraulic conductivity. Saturated hydraulic conductivity is measured by the time taken for water (or roof run off) to pass through the media, as soon as the media attains steady-state saturation. In order to achieve steady-state saturation, the media needs to be flooded with a hydraulic head until liquid (such as water or roof run off) discharges from the system. So in the context of the device described herein, saturated hydraulic conductivity refers to the time it takes for roof runoff to pass through the embodiment treatment media once fully saturated. Saturated hydraulic conductivity is the velocity at which a liquid passes through something—in this case the media. The hydraulic conductivity is also affected by the disturbance or compaction of the media. When media is more densely packed, the hydraulic conductivity and flow rate will be lower.

It will be understood that a medium having a lower hydraulic conductivity will result in higher retention time in the media and possibly higher treatment efficiency. However, such a lower hydraulic conductivity will increase the probability of the roof runoff bypassing the flow. A medium having a higher hydraulic conductivity reduces the probability of roof runoff bypassing the flow, but more media is needed to achieve the same treatment level. The time taken to saturate the media with metals depends largely on the inflow metal concentrations over time and on the amount of media available in the tube.

In some embodiments, the crushed calcium carbonate media 204 has a saturated hydraulic conductivity of at least 0.15 m/min. In some embodiments, the crushed calcium carbonate media 204 has a saturated hydraulic conductivity of about 0.15 m/min to about 0.65 m/min. The saturated hydraulic conductivity may be about 0.2 m/min to about 0.6 m/min, about 0.25 m/min to about 0.55 m/min, about 0.3 m/min to about 0.5 m/min, about 0.35 m/min to about 0.45 m/min, about 0.15 m/min, about 0.2 m/min, about 0.25 m/min, about 0.3 m/min, about 0.35 m/min, about 0.4 m/min, about 0.45 m/min, about 0.5 m/min, about 0.55 m/min, about 0.6 m/min, or about 0.65 m/min.

In some embodiments the device comprises a pH adjustment media 209. The pH adjustment media 209 may be any media capable of lowering the pH of the roof runoff after it has flowed through the crushed calcium carbonate media 204. For example, the pH adjustment media 209 may comprise organic matter, such as coffee grounds, compost, gravel, humus, peat moss, pine needles, or a mixture thereof.

It is advantageous to use a pH adjustment media 209 that comprises a waste product, such as coffee grounds.

The layer of pH adjustment media 209 may be positioned downstream of the crushed calcium carbonate media 204. The pH adjustment media 209 may be positioned within the first tube 101/201, or within an adaptor connecting the first or second tube to the stormwater sump or stormwater pipe 207. In an alternative embodiment, the pH adjustment media 209 may be positioned upstream of the crushed calcium carbonate media 204, for example, if the effluent alkalinity was >7.5-8.0.

With reference to FIGS. 5 and 8, another embodiment of the device will now be described. This embodiment has the same features and functionality as the embodiment shown and described in relation to FIG. 1, except as described below. Like numbers are used to indicate like parts, with the addition of 1000.

FIG. 5 shows a foreign body trap 1111. This embodiment also includes features suitable for sampling, testing, or collecting the water before and/or after it passes through the media. The device 1100 has an inlet sampling bottle 1113 that is in fluid communication with the device at a point before the water enters the media via a conduit 1115.

Downstream from the media, the device 1100 has a perforated end cap 1104a, a funnel 1117, and a self-supporting sleeve 1119 that houses a sampling bottle 120. The sampling bottle is configured to collect a sample of the water that has passed through the media. The self-supporting sleeve 1119 suitably includes a cut out or aperture so the sampling bottle 1120 is readily accessible. The device also includes a funnel shaped outlet that discharges the water to the stormwater network. FIG. 8 shows the device 1100 before the bypass mechanism has been installed.

FIG. 7 shows a modification to the device 1100. In FIG. 7, the device has a base 1123. The base 1123 is a supporting base to bear the weight of the device. In some configurations, the device may not need brackets for mounting to the wall because the base allows the device to be self-supporting. In some configurations the device may have the base and also one or more brackets for mounting to a wall or other support. FIG. 7 shows the base contacts the ground. The base extends from the ground and conceals the majority of the components of the device from view. In some embodiments, the base will extend only partway up the device. In other embodiments, the device may extend further than shown, for example, the base may extend to conceal all of the other components of the device.

EXAMPLES

The following non-limiting examples are provided to illustrate the present invention and in no way limit the scope thereof.

Experiment 1—Batch Experiment

The main purpose of the batch experiment was to evaluate the capability of the treatment materials in reducing the percentage of dissolved Zn and Cu from roof-runoff at the selected grade of $\geq 1.18 \leq 2.36$ mm and to identify whether retention time influenced the percentage reduction of dissolved Zn and Cu.

Preparation of Treatment Materials

The limestone and mussel shells used in this research were purchased from Pearson's LTD Landscape Supplies at $8 per 30 kg bag each. Material that were wet upon purchase were left to air dry prior to crushing. Limestone and mussel shells were crushed using a mechanical crusher. The crushed particles were sorted using selective sieve sizes to obtain a particle size between $\geq 1.18 \leq 2.36$ mm.

Site Selection and Roof Runoff Collection

A zinc roof and a copper roof were used to collect roof-runoff used for both the batch and laboratory column experiments, as well as the field trials.

Roof-runoff for the laboratory experiments was collected during multiple rainfall events by placing 250 L water tanks at the end of two downpipes on each building. Roof-runoff for the laboratory column experiment was transported to the laboratory by transferring water from the 250 L tanks to 20 L containers.

Experiment Method

The materials were evaluated using roof-runoff from two rainfall events. The experiments were repeated twice with roof-runoff from the first rainfall event and three times for the second rainfall event. About 5 L of roof-runoff was collected from both the Zn and Cu roofs and stirred constantly in separate 5 L beakers. This was done to prevent the particles in the roof-runoff from settling and to promote homogeneity of the samples being tested.

From the bulk samples, 50 mL of each treatment material was measured, weighed and washed with deionized water to remove the fine particles and were then poured into separate 150 mL beakers. The sequence of the retention time for each repetition of the experiment was done randomly to eliminate bias using randomize.org-listrandomizer. A timer was set to the first water retention time obtained from the randomisation list and 50 mL of roof-runoff was poured into each beaker containing 50 mL of treatment material (1:1 ratio) and stirred five times using a plastic rod, after which the timer was started. When the timer went off, the treated roof-runoff samples were poured into the empty 50 mL beaker with the designated material and retention time code. All the treated runoff samples as well as a 50 mL sample of untreated roof-runoff and deionized water (representative of a blank) was analysed for pH and dissolved Zn and Cu. New treatment materials were assessed for runoff from each roof and rainfall event. For every 10th sample treated a duplicate was done and every 20th sample a triplicate was done while a blank sample was included for every run of the experiment. This was done to calibrate the Inductively coupled plasma mass spectrometry (ICP-MS) equipment, and to help trace potential sources of contamination that may have been artificially introduced in the samples as well as helping to estimate sampling and laboratory analysis precision (United States Environmental Protection Agency, 2012).

Evaluation of Dissolved Zinc and Copper Reduction and pH Change

Using a 15 mL syringe, 10 mL of water was taken from each of the treated samples, as well as the untreated roof-runoff samples and the blanks in the 50-mL beakers. The extracted samples were filtered (using a 0.45 µm nylon filter) into ICP-MS tubes and two drops of concentrated nitric acid was added as a preservative to ensure pH<2 (Water Environment Federation et al., 2005). All samples were stored in a refrigerator below 4° C. until ICP-MS analysis. The pH of all samples was tested after samples for ICP-MS were extracted to avoid contamination by the metal temperature probe of the pH meter.

Results

Results from the batch experiments showed that the percentage reduction of dissolved Zn and Cu for the batch experiments varied among the two treatment materials and between the roof-runoff type. Comparison of the mean percentage reduction in dissolved Zn and Cu for each treatment material showed that limestone gave the highest mean percentage reduction for both Zn and Cu (87% Zn and 91% Cu) followed by mussel shells (78% Zn and 64% Cu).

The pH of runoff from both roofs that were treated by limestone and mussel shells was considerably higher than the pH of the untreated roof-runoff. There was a strong positive correlation between pH and percentage metal reduction when both Zn (r (25)=0.576<0.0005) and Cu (r (25) =0.677<0.0005) was treated with mussel shells. A small positive correlation for limestone was only observed when Cu was treated (r (25)=0.224<0.05). The relationship between pH and percentage metal reduction was statistically significant.

Experiment 2—Laboratory Column Treatment Systems

The purpose of this experiment was to evaluate the hydraulic conductivity and metal removing performance of the materials in a tube system.

Laboratory Column Treatment System Experimental Design

Clear acrylic pipes (110 mm outside diameter, 100 mm inside diameter) were cut to a length of 1.2 m. A clear pipe was used so that compaction of the materials and movement of the runoff through the treatment materials could be observed. Thirty-three 6 mm holes were drilled in PVC storm-caps and a 500 µm mesh was placed inside to prevent the treatment materials from falling through the holes. The storm caps were fitted at the base of each pipe and each treatment material was poured into the pipes during which the exterior of the pipe was pounded by hand in a circular-upward motion to increase compaction. Each treatment material at both depths was weighed and poured into the pipes that were set up for the laboratory column experiments. The same circular-upward pounding motion was applied. Each treatment material was flushed with tap water to remove the fine particles. A 250 L tank was filled with roof-runoff and a water pump was placed Inside the tank to homogenize the water before testing. A peristaltic pump was used to transfer the roof-runoff from the 120 L tanks into each treatment material at flow rates of 1 L/min and 3 L/min. Runoff from the Zn and Cu roofs were assessed separately using fresh treatment materials.

Constant-Head Saturated Hydraulic Conductivity

In designing and assessing the performance of the downpipe treatment systems, the hydraulic conductivity of the treatment materials was a design consideration to help determine the maximum roof area and runoff volume at varying rainfall intensity that would be treated before a bypass would be required. After each system was flushed, tap water (via a hose) was allowed to run through each column at a very low rate and slowly increasing the flow until the water was above the treatment materials. The slow increase in water flow from the tap was done to limit the amount of air trapped in the system which could affect the hydraulic conductivity of the materials. The flowrate was adjusted until a constant head of 12 cm above each treatment material was achieved. A 1000 mL measuring cylinder was placed at the base of the treatment system and the time it took to fill was recorded for each treatment material. This was repeated three times for each material and the average time was used in calculating the saturated hydraulic conductivity ($K_{sat}$) using the derivation of Darcy's Equation:

$$Ksat = \frac{Q \times L}{A \times (L+P)}$$

Where: $K_{sat}$=saturated hydraulic conductivity (m/s),
Q=flow through the saturated substrate (m3/s)
L=depth of the substrate layers (m)
A=cross sectional area of the substrate (m$^2$)
P=water depth overlying the substrate (m)

The $K_{sat}$ was tested for both undisturbed and disturbed materials at 1 m and 0.5 m depths.

Laboratory Treatment System Experimental Procedure

This experiment was to quantify the hydraulic performance and dissolved metal reduction of each treatment material at varying depths and flow rates. Material depths of 1 m (7.8 L of material) and 0.5 m (3.9 L of material) were used as a benchmark to determine which depth provided a satisfactory combination of hydraulic conductivity and dissolved Zn and Cu reduction. To evaluate the performance of each material at a depth of 0.5 m, half of the material from the 1 m depth experiments was removed. This resulted in materials being disturbed which affected material compaction. Therefore, the performance of the disturbed materials was checked against undisturbed equivalents to determine whether disturbance affected the hydraulic conductivity and percentage metal reduction for treatment materials.

Due to the variation in rainfall intensity, the reduction of dissolved Zn and Cu by each treatment material was also evaluated at a low (1 L/min) and high (3 L/min) flow rate for a duration 15 minutes. The rainfall intensity in Christchurch, New Zealand is typically low in which 95% of the rainfall events with a duration 1.6 hour is 55.1 mm/hr (NIWA, 2017). Thus, at a flow rate of 1 L/min and a rainfall intensity of 5.1 mm/hr, the treatment systems would be able to treat runoff from a roof area of 12 m$^2$ before a bypass is required while at a high flow rate of 3 L/min and a roof area of 12 m$^2$, the treatment system would be able to treat roof-runoff from a high rainfall intensity of 15 mm/hr before a bypass is required (eqn. 2). A rainfall intensity of 15 mm/hr is representative of a 1.58 years average recurrence interval (ARI) with a duration of 30 minutes for Ilam, Christchurch (NIWA, 2017).

$$\text{Flow rate (m}^3\text{/hr)=Roof Area (m}^2\text{)} \times \text{Rainfall intensity (m/hr)}$$

The process by which the flow rates were initially selected was that the performance of the treatment materials was to be assessed at a low and high flow rate (1 L/min and 3 L/min) for a minimum flow duration of 15 minutes (to identify possible trends with time). Also, a replication of the treatment materials at a depth of 1 m using roof-runoff from the same rainfall event was required to assess the accuracy of the procedure and sampling methods. With a 250 L tank being available to store the roof-runoff in the laboratory; the need to replicate the procedure using roof-runoff from the same rainfall event; and two flow rates of 1 L/min and 3 L/min, the maximum flow duration that could be achieved was 15 minutes. It was only possible to assess two treatment materials at the two flow rates for 15 minutes with the volume of water available from the 250 L tank. A 250 L tank was used to run the experiment at both flow rates for 15 minutes for all treatment materials at a depth of 0.5 m since there was no repetition required with roof-runoff from the same rainfall event.

Each treatment material was evaluated with runoff from the Zn and Cu roofs from two separate rainfall events at material depths of 1 m and 0.5 m. The performance of each treatment material at a disturbed and undisturbed depth of 1 m and 0.5 m was evaluated using the two flow rates (1 L/min first). Evaluation of materials at 1 m depths was repeated twice for each rainfall event while materials at 0.5 m were evaluated only once for each rainfall event. Separate and fresh treatment materials were assessed for runoff collected from the Zn and Cu roofs.

Sampling Method

About 600 mL of treated runoff for each treatment material at both flow rates was collected at 0, 5, 10 and 15 minutes by placing a 1000 mL beaker below each treatment system. To determine the percentage reduction of dissolved Zn and Cu achieved by each treatment material, roof-runoff samples were taken at the end of the hose from the peristaltic pump that fed into the treatment materials at the beginning and end of each experiment for each material. These two roof-runoff samples were taken to observe if there was any disparity in the metal concentration of the untreated roof-runoff. These two samples were taken when the experiment was being conducted at both flow rates and for both treatment materials. To determine the percentage of Zn and Cu that was in the dissolved form in the untreated roof-runoff used in this research, both total and dissolved Zn and Cu was tested.

Evaluation of pH Change, Total and Dissolved Zn and Cu

The pH and dissolved Zn and Cu assessment for the laboratory experiment was done as described previously. For the evaluation of total Zn and Cu, 25 mL of sample from both the untreated and treated roof-runoff taken at 0 and 15 minutes was placed in a centrifuge tube and 5 mL of concentrated nitric acid was added to obtain a pH<2. The tubes were placed in a 120° C. digestion block for an hour after which they were left to cool for 15 minutes. 10 mL of each sample was filtered into separate ICP-MS tubes using a disposable syringe and a 0.45 µm, 25 mm nylon syringe filter Federation & Association, 2005. All samples were stored in a refrigerator at a temperature<4° C. prior to ICP-MS analysis.

Statistical Analysis

One-way analysis of variance (ANOVA) was used to determine whether there were any statistically significant differences in the percentage dissolved Zn and Cu reduction and pH change among the treatment materials. It could not be established that the outliers observed in this research were due to data entry or measurement error, therefore, they were treated as genuinely unusual data points. The outliers were included in the analysis because it was not believed that the result would be materially affected, which was determined by comparing the results of the one-way ANOVA on the original data to the transformed data. The Shapiro-Wilk test and Q-Q plots were used to determine whether the data was normally distributed. For data that was not normal, the one-way ANOVA was still used because it is considered to be fairly robust to deviations from normality, particularly if the sample sizes are equal, which was the case in this research. A Turkey's post-hoc test was done as part of the one-way ANOVA procedure. The Pearson's product moment correlation was used to determine the strength and direction of a linear relationship between pH and percentage reduction of dissolved Zn and Cu for roof-runoff treated by limestone and mussel shells.

Results—Hydraulic Conductivity

At a depth of 0.5 m, the hydraulic conductivity for limestone and mussel shells ranged from 21.6 m/hr-33.6 m/hr and 12 m/hr-33.6 m/hr respectively. At a depth of 1 m the hydraulic conductivity for limestone and mussel shells ranged from 27 m/hr-34.2 m/hr and 24 m/hr-29.4 m/hr respectively. The results showed that the hydraulic conductivity was the same for both treatment materials at an undisturbed depth of 1 m but varied greatly when the materials were disturbed. Overall, undisturbed materials at a depth of 0.5 m was observed to have the lowest hydraulic conductivity.

Results—Dissolved Metal Reduction

For the treatment of dissolved Zn, the results showed that 95-99% reduction was achieved by both treatment materials at both depths, flow rates and disturbances. On the other hand, it was observed that a significantly higher reduction ($p \leq 0.05$) in dissolved Cu was achieved at a depth of 1 m compared to 0.5 m. However, >90% reduction in dissolved Cu by all treatment materials were only achieved at an undisturbed depth of 1 m. At a depth of 0.5 m, the percentage reduction of dissolved Cu for limestone and mussel shells ranged from 18.62%-97.2% and 35.87%-97.66% respectively with the lowest values obtained when the materials were undisturbed. Overall, it was observed that the percentage reduction in dissolved Zn was greater and more consistent than Cu for both treatment materials.

With mean a percentage reduction of >95% 2n, both treatment materials reduced the dissolved concentration of Zn, which ranged from 150 μg/L-254 μg/L in the untreated roof-runoff, to concentrations well below ANZECC's mixed instream guideline value of 15 μg/L total Zn for the protection of 90% of freshwater organism's. With a mean percentage Cu reduction of >90% at an undisturbed depth of 1 m, none of the treatment materials reduced dissolved Cu to concentrations below ANZECC's 90% mixed guideline of 1.8 μg/L total Cu. However, both the treatment materials reduced the concentration of dissolved Cu, which ranged from 312 μg/L-884 μg/L in the untreated roof-runoff, to concentrations below 20 μg/L.

Experiment 3—Field Evaluation of the Downpipe Treatment System

The purpose of this experiment was to evaluate the system in a field experiment.

Only mussel shells was selected for this field evaluation and a single treatment system was installed (in a downpipe of a galvanized and a copper roof). Mussel shells at an undisturbed depth of 1 m was selected for field evaluation, as mussel shells are a lightweight, cheap, readily available waste product. The lightweight aspect of mussel shells is an advantage because the treatment system had to be attached to the downpipe of the roof, which means the device is lighter than if other, heavier, media is used.

The downpipe treatment systems were evaluated for 2 months during which the Zn and Cu removal capacity of the mussel shells was evaluated under varying rainfall intensities and duration which were then compared to results from the laboratory column experiments. The functionality of the treatment systems was visually assessed for clogging and other operational issues.

The pH and dissolved Zn and Cu assessment for the field experiment was done using the same methods for the laboratory experiments as described previously.

Site Selection

The buildings used to conduct the field experiments were the same buildings where roof-runoff was collected to conduct the laboratory experiments. Runoff from the same buildings were used for the laboratory and field experiments to ensure consistency and to minimise the introduction of additional variables that could confound the key parameters that were being evaluated in this research, thus enabling comparison of the results from the laboratory and field experiments.

Downpipe Treatment System Design and Installation

The downpipe treatment system evaluated in the field trial was a similar design to the laboratory column treatment system, however, stormwater PVC pipes (instead of clear acrylic pipes) were used. The device used for field trials is shown in FIG. 1. Two PVC pipes (110 mm outside diameter, 100 mm inside diameter) were cut to a length of 1.2 m. Thirty-three 6 mm holes were drilled in PVC storm-caps and a 500 μm mesh was placed inside to prevent the treatment materials from falling through the holes. The storm caps were fitted at the base of each pipe and the 1 m depth of mussel shells used in laboratory column experiments for the treatment of dissolved Zn and Cu were poured into separate pipes. While pouring the mussel shells into the pipes, the exterior of each pipe was pounded by hand in a circular-upward motion to increase compaction. Each treatment system containing Zn-treated and Cu-treated mussel shells was attached vertically to the existing downpipe of their corresponding building (i.e. Zn-treated mussel shells attached to galvanized roof). A bypass was included in the design to avoid water from backing up to the roof when rainfall rate exceeded the hydraulic capacity of the treatment material.

To determine the percent reduction in dissolved Zn and Cu achieved by the mussel shells, both untreated and treated roof-runoff samples were required. To collect untreated roof-runoff samples, a 10 mm hole was drilled through the downpipe above the treatment material. A small funnel was glued on the inside the pipe above the hole and an attached tube was pushed through the hole. A 1 L ThermoFisher Scientific™ Nalgene™ high-density polyethylene (HDPE) bottle was attached below the tube to collect untreated runoff samples and one was secured at the base of the downpipe to collect treated runoff samples. The 1 L HDPE bottles were used to collect untreated and treated first flush roof-runoff samples because it was not always possible to be present at the beginning of a rainfall event particularly at nights. Clean 1 L polypropylene terephthalate (PET) bottles were used to collect untreated and treated roof-runoff samples during steady state rainfall.

Sampling Method

The weather station at the University of Canterbury Environmental Laboratory was used to collect rainfall data for the sampled events. First-flush samples were collected for rainfall events that occurred during the day and night while steady state samples were collected only for events that occurred during the day. At each sampling time, both untreated and treated roof-runoff were collected to assess the percentage reduction in dissolved Zn and Cu at the given time. The duration of rainfall events and the time samples were collected were guided by weather forecasts. For the purpose of this research, an individual rainfall event was considered to be rainfall that began at least 6 hours after a dry period.

Results

Evaluation of the concentration of dissolved Zn and Cu in the untreated runoff from both roofs showed that dissolved Zn from the galvanized roof ranged from 406-2,262 μg/L while dissolved Cu from the copper roof ranged from 455-2,581 μg/L. The concentration of both dissolved Zn and Cu was significantly higher than ANZECC's mixed instream guideline values of 15 μg/L and 1.18 μg/L for total Zn and Cu respectively for the protection of 90% freshwater organisms. The concentration of dissolved Zn (406-2,262 μg/L) and Cu (455-2,581 μg/L) in the roof-runoff evaluated during the field trial reached levels that were considerably higher than the dissolved Zn (150-254 μg/L) and Cu (312-884 μg/L) concentrations obtained for the roof-runoff used in the laboratory experiments. For roof-runoff treated with 1 m depth of undisturbed mussel shells, it was observed that the concentration of dissolved Zn (1.95-7.63 μg/L) and Cu (3.64-4.06 μg/L) in the laboratory experiments were reduced to lower concentrations compared to the dissolved Zn (41-287 μg/L) and Cu (11-182 μg/L) in the field experiments. The concentration of both dissolved Zn and Cu obtained in the treated runoff for the field experiments was also higher than ANZECC's mixed instream guideline values of 15 μg/L and 1.18 μg/L for total Zn and Cu respectively, for the protection of 90% freshwater organisms.

The results showed that dissolved Zn in runoff from the galvanized roof was reduced by 82-97% while dissolved Cu in runoff from the copper roof was reduced by 86-98%. The results obtained in the field experiments were comparable to the percentage Zn (90-99%) and Cu (92-99%) reduction obtained when 1 m depth of undisturbed mussel shells was used in the laboratory column experiments. However, the concentration of dissolved Zn and Cu in roof-runoff treated by mussel shells in the laboratory column experiment was much lower than what was obtained in the field experiments.

Results from the Pearson's product-moment correlation showed a strong positive correlation between the pH and the percentage reduction in dissolved Cu in the treated runoff from the copper roof, however, no correlation was observed for Zn in treated runoff from the galvanize roof. The results also showed no evidence of a correlation between rainfall duration and percentage metal reduction or rainfall depth/intensity and percentage metal reduction. Comparison of the pH results obtained in the field and laboratory column experiments for roof-runoff treated by 1 m depth of undisturbed mussel shells showed that the pH of Zn (7.42-9.12) and Cu (7.14-9.31) treated runoff in the laboratory experiments reached levels that were generally higher than the pH of Zn (6.68-7.98) and Cu (7.23-8.91) treated runoff in the field experiments.

Experiment 4—Larger Devices

Four larger devices were constructed, installed and tested. These larger devices have the same features and functionality as the embodiment shown and described in relation to FIG. 2, except as described below. The results of the experiments using the larger devices are described below:

Design 1: Two Zinc roofs and Two Copper roofs. The Zinc roofs were steels roofs that have a coating that includes Zinc and Aluminium. The device had an inner tube with a length of about 1 m and an internal diameter about 100 mm.

The test results from 4-5 sampling events are:
Zinc removal from the zinc metal roofs showing between 69-90% removal with a media comprising about 50% shells and about 50% limestone.
Copper removal from copper metal roofs showing up to 60% removal with a media of 100% shells.

Experiment 5—Larger Devices

Three galvanised (Zinc) roofs—The device had an inner tube with a length of about 1.5 m with an internal diameter of about 150 mm. The media was >2.36 mm uncrushed shells:

Test Results from One Sampling Event:
a. Zinc removal from two different metal roof types (high and lower zinc release surfaces) showing up to 97% removal, including from extremely high roof runoff (>20,000 ug Zn/L) concentrations. Up to 74% removal from roof runoff 465 ug Zn/L Hydraulics:
Shells only>2.36 mm=39 m/hr (39,000 mm/hr)
Uncrushed shells (as received from source including fractions<2.36 mm)=28 m/hr (28,000 mm/hr)
The uncrushed shells (as received from source) were slightly lower than those sieved>2.36 mm because the fines<2.36 mm reduced the hydraulic throughput.
Mixture: 50% limestone+50% uncrushed shells (as received from source including fractions<2.36 mm)=67.5 m/hr (67,500 mm/hr)

Preferred embodiments of the invention have been described by way of example only and modifications may be made thereto without departing from the scope of the invention.

The invention claimed is:

1. A device for treating roof runoff, the device comprising:
a first tube adapted to be axially aligned with, and in fluid communication with, an outlet of a downpipe, the first tube containing a crushed calcium carbonate media;
a second tube in fluid communication with the first tube;
the first tube and second tube being arranged such that when a flow of roof runoff from the downpipe is at or below a predetermined flow rate, the flow of roof runoff is directed into the first tube to be treated by the crushed calcium carbonate media contained therein without any runoff in contact with the second tube, and when the flow of roof runoff is above the predetermined flow rate, the flow of roof runoff is directed into the first tube, a portion of the flow passes through the media, and the remaining excess flow passes through the second tube but not through the first tube as an overflow from the first tube.

2. The device according to claim 1, wherein the device is adapted to be fitted to an existing downpipe.

3. The device according to claim 1, wherein the first tube is adapted to receive a downpipe.

4. The device according to claim 1, wherein the calcium carbonate media comprises a marine organism shell, limestone, snail shell, eggshell, dead coral, or a mixture thereof.

5. The device according to claim 4, wherein the marine organism shell is mussel shell.

6. The device according to claim 1, wherein the crushed calcium carbonate media is crushed to an average particle size of up to about 10 mm.

7. The device according to claim 6, wherein the crushed calcium carbonate media is crushed to an average particle size of from about 1 mm to about 3 mm.

8. The device according to claim 1, wherein the first tube is positioned inside the second tube.

9. The device according to claim 1, wherein the device decreases the concentration of dissolved heavy metals in the roof runoff.

10. The device according to claim 1, wherein the device decreases the concentration of dissolved zinc and copper in the roof runoff.

11. The device according to claim 1, wherein the device decreases the concentration of dissolved zinc in the roof runoff by greater than about 80%.

12. The device according to claim 1, wherein the device decreases the concentration of dissolved copper in the roof runoff by greater than about 80%.

13. The device according to claim 1, wherein the device decreases the concentration of dissolved zinc and copper in the roof runoff by greater than about 80%.

14. The device according to claim 1, wherein the device comprises at least one foreign body trap.

15. The device according to claim 1, wherein the crushed calcium carbonate media has a minimum saturated hydraulic conductivity of about 0.15 m/min.

16. The device according to claim 15, wherein the crushed calcium carbonate media has a saturated hydraulic conductivity of about 0.15 m/min to about 0.56 m/min.

17. The device according to claim 1, wherein the first tube is removable and/or replaceable.

18. A device for treating roof runoff, the device comprising:
a first tube adapted to be axially aligned with, and in fluid communication with, an outlet of a downpipe, the first tube containing a crushed calcium carbonate media;
a second tube in fluid communication with the first tube;
the first tube and second tube being arranged such that when a flow of roof runoff from the downpipe is at or below a predetermined flow rate, the flow of roof runoff is directed into the first tube to be treated by the crushed calcium carbonate media contained therein without any runoff in contact with the second tube, and when the flow of roof runoff is above the predetermined flow rate, the flow of roof runoff is directed into the first tube, a portion of the flow passes through the media, and the remaining excess flow passes through the second tube but not through the first tube as an overflow from the first tube, and
wherein the first tube comprises a pH adjustment media downstream of the calcium carbonate media.

19. The device according to claim 18, wherein the device is adapted to be fitted to an existing downpipe.

20. The device according to claim 18, wherein the first tube is adapted to receive a downpipe.

21. The device according to claim 18, wherein the calcium carbonate media comprises a marine organism shell, limestone, snail shell, eggshell, dead coral, or a mixture thereof.

22. The device according to claim 21, wherein the marine organism shell is mussel shell.

23. The device according to claim 18, wherein the crushed calcium carbonate media is crushed to an average particle size of up to about 10 mm.

24. The device according to claim 23, wherein the crushed calcium carbonate media is crushed to an average particle size of from about 1 mm to about 3 mm.

25. The device according to claim 18, wherein the first tube is positioned inside the second tube.

26. The device according to claim 18, wherein the device decreases the concentration of dissolved heavy metals in the roof runoff.

27. The device according to claim 18, wherein the device decreases the concentration of dissolved zinc and copper in the roof runoff.

28. The device according to claim 18, wherein the device decreases the concentration of dissolved zinc in the roof runoff by greater than about 80%.

29. The device according to claim 18, wherein the device decreases the concentration of dissolved copper in the roof runoff by greater than about 80%.

30. The device according to claim 18, wherein the device decreases the concentration of dissolved zinc and copper in the roof runoff by greater than about 80%.

31. The device according to claim 18, wherein the device comprises at least one foreign body trap.

32. The device according to claim 18, wherein the crushed calcium carbonate media has a minimum saturated hydraulic conductivity of about 0.15 m/min.

33. The device according to claim 18, wherein the crushed calcium carbonate media has a saturated hydraulic conductivity of about 0.15 m/min to about 0.56 m/min.

34. The device according to claim 21, wherein the first tube is removable and/or replaceable.

* * * * *